(12) United States Patent
Suenaga (10) Patent No.: US 9,124,080 B2
(45) Date of Patent: Sep. 1, 2015

(54) WIRE ACCOMMODATION PROTECTOR (71) Applicant: Sumitomo Wiring Systems, Ltd., Yokkaichi, Mie (JP)

(72) Inventor: Ryo Suenaga, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 143 days.

(21) Appl. No.: 14/047,175

(22) Filed: Oct. 7, 2013

(65) Prior Publication Data

US 2014/0102744 A1 Apr. 17, 2014

(30) Foreign Application Priority Data

Oct. 17, 2012 (JP) ................................. 2012-229978

(51) Int. Cl.
*H02G 3/04* (2006.01)
(52) U.S. Cl.
CPC .................. *H02G 3/0418* (2013.01)
(58) Field of Classification Search
CPC ..... H02G 3/0418; H02G 3/04; H02G 3/0425; H02G 3/0431
USPC ............................. 174/50; 248/906; 439/535
See application file for complete search history.

(56) References Cited

U.S. PATENT DOCUMENTS 5,942,729 A * 8/1999 Carlson et al. ............... 174/68.1

FOREIGN PATENT DOCUMENTS

JP 6-70415 9/1994

* cited by examiner

*Primary Examiner* — Dhirubhai R Patel
(74) *Attorney, Agent, or Firm* — Gerald E. Hespos; Michael J. Porco; Matthew T. Hespos (57) ABSTRACT

A wire accommodating protector includes a protector body and a lid for covering the protector body. Lock lugs are provided on outer peripheral edges of the lid and protrude toward the protector body in a manner that allows the lock lugs to flex. Each of the lock lugs has a lock projection provided thereon. Lock lug insertion holes are formed in sidewalls of the protector body, the lock lug insertion holes extend within and down the full height of the sidewalls and are open at top surfaces of the sidewalls. Each of the lock lug insertion holes has a lock protrusion formed therein. The lid is adapted to interlock with the protector body when the plurality of lock lugs are inserted into the respective plurality of lock lug insertion holes so as to engage the lock projections with the lock protrusions.

3 Claims, 6 Drawing Sheets

WIRE ACCOMMODATION PROTECTOR

BACKGROUND

1. Field of the Invention

The invention relates to a wire accommodation protector for holding multiple wires laid therethrough that are routed inside an automobile and other apparatuses.

2. Description of the Related Art

Wiring components of automobiles conventionally have a multiplicity of routed wires laid though and held within a wire accommodation protector. The wires are secured at suitable locations to protect the wires from external members that might otherwise interfere with the wires and restrict the routing of the wires.

JP H06-70415U discloses a wire accommodation protector that comprises a generally trough-shaped protector body and a lid that covers the top opening of the protector body. Wires are laid through the protector body. The lid then is secured to the protector body via a locking mechanism that protrudes from the sidewalls of the protector body. Thus, the protector can hold the multiplicity of wires therethrough.

Figure 6:
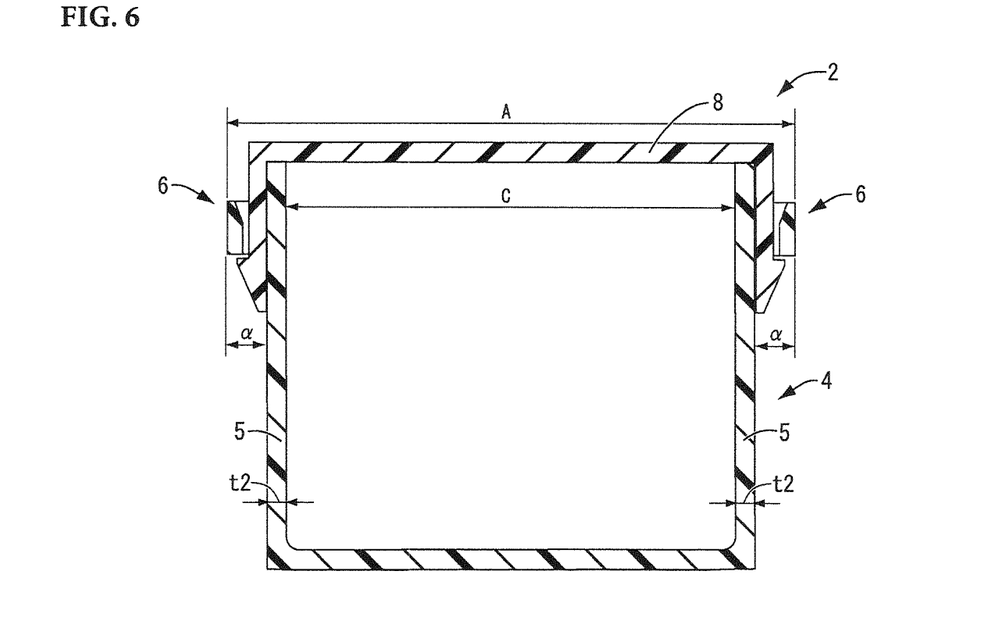
FIG. 6 is a cross section of a wire accommodation protector with a conventional structure corresponding to the view in FIG. 5.

Wire accommodation protectors having the foregoing conventional structure suffer from an inherent problem. In particular, the locking mechanism protrudes out from sidewalls of the protector body and inevitably sacrifices some of the capacity of the wire accommodating portion of the protector body. More particularly, assume that an allowable space A is given to dispose a wire accommodation protector 2, as schematically shown in FIG. 6. The wire accommodation protector 2 has a protector body 4 with sidewalls 5 that must be shifted inward by the space required to fit the locking mechanism 6 protruding out from the sidewalls 5 of the protector body 4 (α×2). This creates dead space in regions a below the locking mechanism 6 and in the areas not occupied by the locking mechanism 6, thus detrimentally reducing the accommodating space C inside the protector body 4.

The demand for downsizing automobiles has been growing in recent years while the quantity of on-vehicle electrical equipment has also been increasing. Accordingly, there is a need to increase the accommodating space inside the protector body without enlarging the allowable accommodating space A for mounting the wire accommodation protector. At times, the conventionally structured wire accommodation protector 2 has been unable to meet this requirement sufficiently. In particular, there have been cases in which the lid 8 could not easily interlock with the protector body 4 because there were too many wires for the capacity of the wire accommodation protector 2.

The invention has been made in the light of the above-described circumstances and, as a solution to the problem, provides a wire accommodation protector with a novel structure that can reduce the dead space associated with the entire protector, thereby maximizing the space for accommodating wires inside the protector body.

SUMMARY OF THE INVENTION

The invention relates to a wire accommodating protector comprising a protector body extending in the shape of a trough and a lid for covering a top opening of the protector body. Lock lugs are provided on outer peripheral edges of the lid and protrude toward the protector body in a manner that allows the lock lugs to flex. Each lock lug has a lock projection provided thereon. Lock lug insertion holes are formed in sidewalls of the protector body. The lock lug insertion holes extend within and down the full height of the sidewalls and are open at top surfaces of the sidewalls. Each lock lug insertion hole has a lock protrusion formed therein. The lid is adapted to interlock with the protector body when the lock lugs are inserted into the respective lock lug insertion holes so that the lock projections engage the lock protrusions.

The lock projections and the lock protrusions are in the sidewalls of the protector body, and together constitute a locking mechanism for locking the protector body and the lid. This configuration enlarges the space between the sidewalls of the protector body to a maximum allowable accommodating space for the wire accommodation protector as compared to the conventional structure, in which the locking mechanism protrudes from the outer surfaces of the sidewalls of the protector body. This configuration also advantageously reduces the dead space alongside the protector body created by the locking mechanism protruding from the outer surfaces of the sidewalls, which in turn significantly expands the space for accommodating wires within the protector body.

The disposition of the lock projections and the lock protrusions within the sidewalls of the protector body achieves a maximum allowable space between the sidewalls. Thus, the wire accommodation protector does not jut out of an allowable accommodating space, thus remaining compact while expanding the space for accommodating wires within the protector body.

The lock projections and the lock protrusions contained within the sidewalls of the protector body avoid the danger of the lock projections and the lock protrusions snagging wires in the surrounding areas and causing malfunctions, such as broken wires. Additionally, the elimination of parts and elements that would otherwise protrude from the sidewalls improves the external appearance of the wire accommodating protector.

The thickness of the sidewalls of the protector body where the lock lug insertion holes are formed is slightly larger than that of other regions of the sidewalls. Further, the regions of the inner surfaces of the sidewalls where the lock lug insertion holes are formed protrude more inward of the protector body than other regions of the inner surfaces of the sidewalls where no lock lug insertion holes are formed. Thus, sufficient rigidity is ensured for the lock lug insertion holes and the mating lock lugs while advantageously creating sufficient space for engagement between the lock projections and the lock protrusions. This construction advantageously achieves stable locking.

The inward protrusions of the sidewalls where the lock lug insertion holes are formed ensure sufficiently thick sidewalls in the regions where the lock lug insertion holes are formed. This configuration maximizes the accommodating space within the protector body in the regions other than where the lock lug insertion holes are formed. Therefore, compared to the conventional structure, the dead space created by the locking mechanism is reduced drastically and the capacity of the wire accommodation protector advantageously is improved while ensuring the locking mechanism has stable locking.

Each lock projection is provided on an outer surface of the respective lock lug. Moreover, each of the lock protrusions is provided between an outside inner surface and an inside inner surface of the respective lock lug insertion hole. The outside and inside inner surfaces oppose each other and define the insertion hole, whereas the lock protrusion protrudes from the outside inner surface toward the inside inner surface. A gap is formed between a protrusion end face of the lock protrusion and the inside inner surface of the lock lug insertion hole with the protrusion end face opposing the inside inner surface. The gap permits a lock projection forming portion of the lock lug to be inserted therein.

The lock projection is on the outer surface of each lock lug protruding from the outer peripheral edge of the lid. This advantageously avoids interference between the wires laid through the protector body and the lock projections when mounting the lid on the protector body. In addition, the lock lugs flex inward of the lid when mounting the lid. This flexure of the lugs reduces the upward deformation of the lid away from the top opening of the protector body, thus stably retaining the lid once it is mounted.

A locking mechanism for locking the lid to the protector body is contained within the sidewalls of the protector body in accordance with the wire accommodating protector of the invention. This configuration advantageously reduces the inconvenient dead space created by the outwardly protruding locking mechanism on the sidewalls of the conventional structure, and in turn significantly expands the space for accommodating wires within the protector body.

DETAILED DESCRIPTION OF THE PREFERRED EMBODIMENTS

Figure 1:
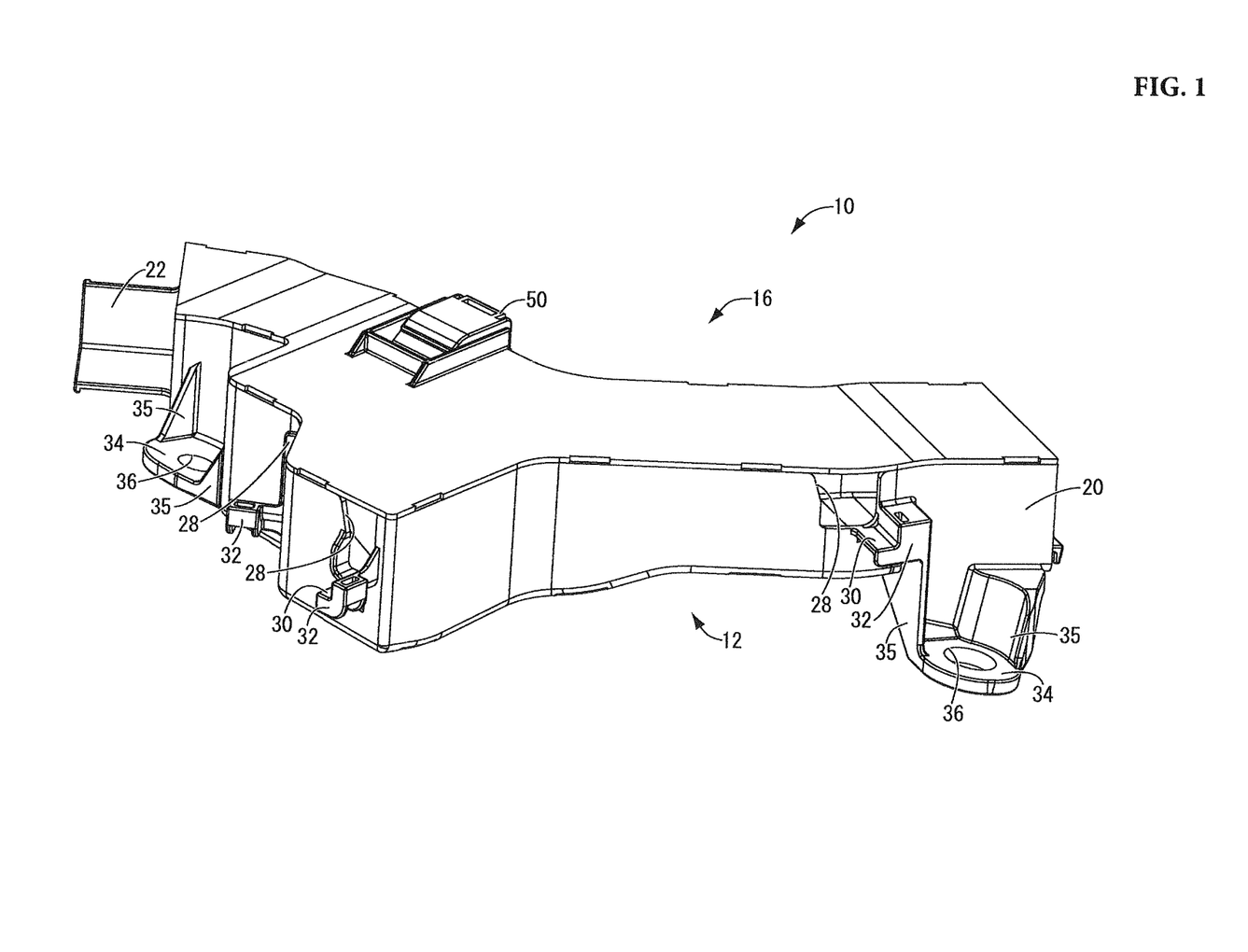
FIG. 1 is a general perspective view of a wire accommodation protector according to one embodiment of the present invention.

FIGS. 1-5 show an embodiment of a wire accommodation protector according to the invention. The wire accommodation protector 10 comprises a protector body 12 extending in the shape of a trough and a lid 16 that covers the top opening 14 of the protector body 12. The wire accommodation protector 10 accommodates a wire harness (not shown) laid through the protector body 12. As used in the description of the embodiment below, "above," "top," "upper," and "upward" indicate that an object is higher in relation to a referenced object as seen in FIG. 1, whereas "below" indicates that an object is lower in relation to a referenced object as seen in FIG. 1. Likewise, "forward" and "rearward" refer to directions left and right, respectively, of referenced objects in FIG. 1.

Figure 2:
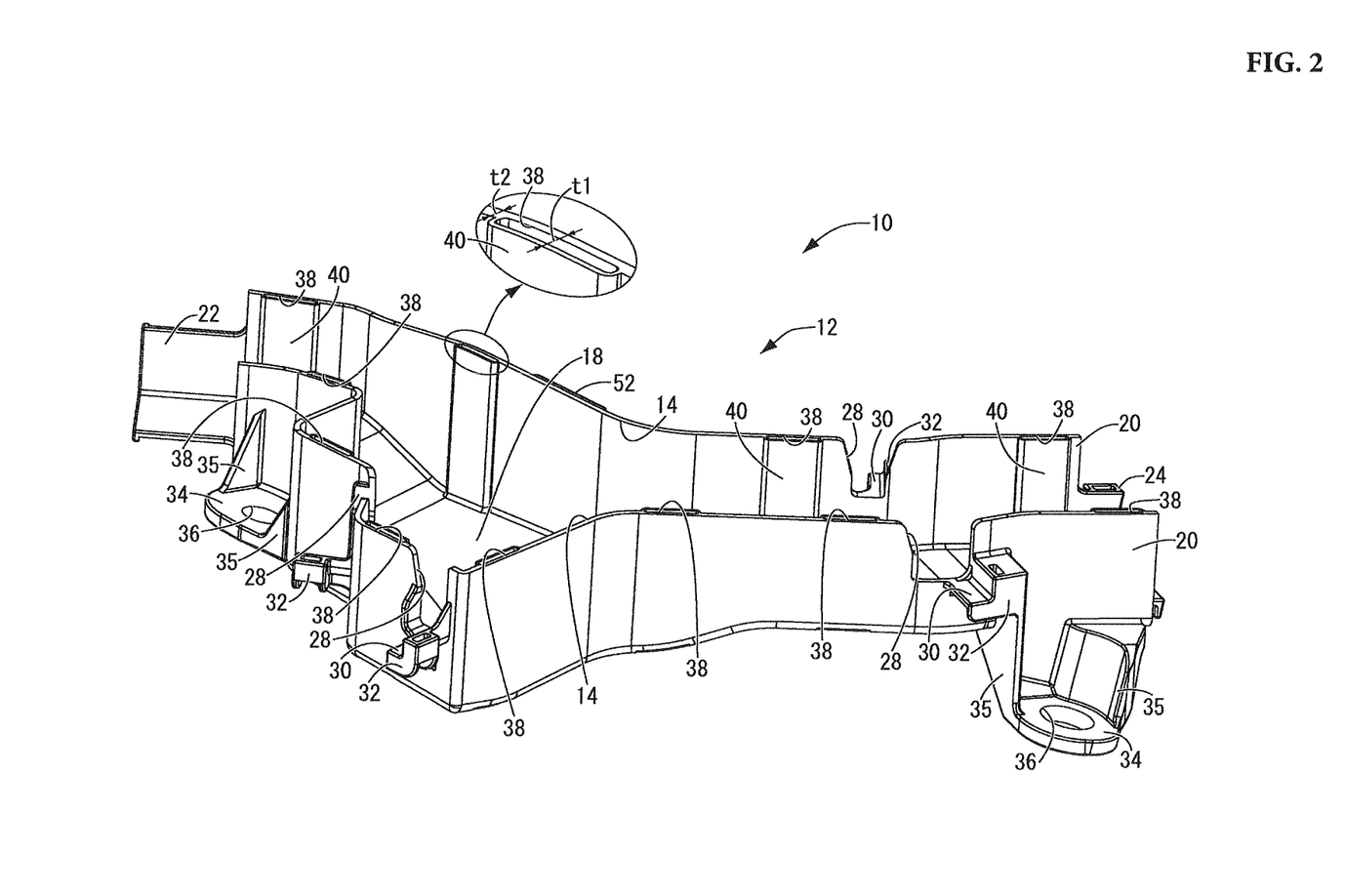
FIG. 2 is a perspective view of the protector body of the wire accommodation protector shown in FIG. 1.

As shown in FIG. 2, the protector body 12 is in the shape of a trough comprising a bottom wall 18 and two sidewalls 20 rising up from the opposing sides of the bottom wall 18. The protector body 12 is formed integrally or unitarily of polypropylene (PP), polyamide (PA), or any other suitable synthetic resin, for example, by inject molding. An L-shaped guide 22 is at the longitudinally forward end of the protector body 12 and extends longitudinally out from the rear sidewall 20 and the bottom wall 18. The main line (not shown) of the wire harness laid through the protector body 12 is guided by the guide portion 22 along a predetermined direction at the longitudinally forward end of the protector body 12. Additionally, a tying band fastening portion 24 extends from the rear sidewall 20 at the longitudinally rear end of the protector body 12. The fastening portion 24 allows the main line of the wire harness to be fastened to the protector body 12. In this embodiment, a single U-shaped cutout 28 is formed in the rear sidewall 20 and three U-shaped cutouts 28 are formed in the front sidewall 20. A guide 30 and a tying band fastening portion 32 are provided on the outer edge of each cutout 28 to fasten and guide a branch line (not shown) of the wire harness in a predetermined direction. It should be noted that any number of cutouts 28 may be provided as required by spacing them apart longitudinally along the sidewalls 20. In addition, two disk-shaped fixing portions 34 are formed on the respective ends of the front sidewall 20 to protrude out from the sidewall 20 in the direction of the thickness of the sidewall. Each fixing portion 34 is supported by two generally triangular supports 35 that extend obliquely up from the side surface of the fixing portion 34 and connect to the sidewall 20. Each fixing portion 34 includes a through-hole 36 formed at the center thereof to allow the protector body to be fastened to the automobile body with a bolt (not shown).

As shown in FIG. 2, a plurality of lock lug insertion holes 38 are formed in the sidewalls 20 of the protector body 12. The lock lug insertion holes 38 extend within and down the full height of the walls 20 and are open at the top surfaces of the walls 20. In this embodiment, four lock lug insertion holes 38 are formed in the rear sidewall 20 with seven lock lug insertion holes 38 formed in the front sidewall 20. However, any suitable number of lock lug insertion holes 38 may be provided as required at spaced apart intervals longitudinally along the walls 20. The regions of the inner surfaces 40 of the sidewalls 20 in which the lock lug insertion holes 38 protrude slightly inward of the protector body 12. In particular, the regions of the sidewalls 20 in which the lock lug insertion holes 38 are formed has a thickness of t1 slightly greater than the thickness t2 of the other regions of the sidewalls 20, where no lock lug insertion holes 38 are formed. A lock projection 44 is provided in each lock lug insertion holes 38 as described further below.

Figure 3:
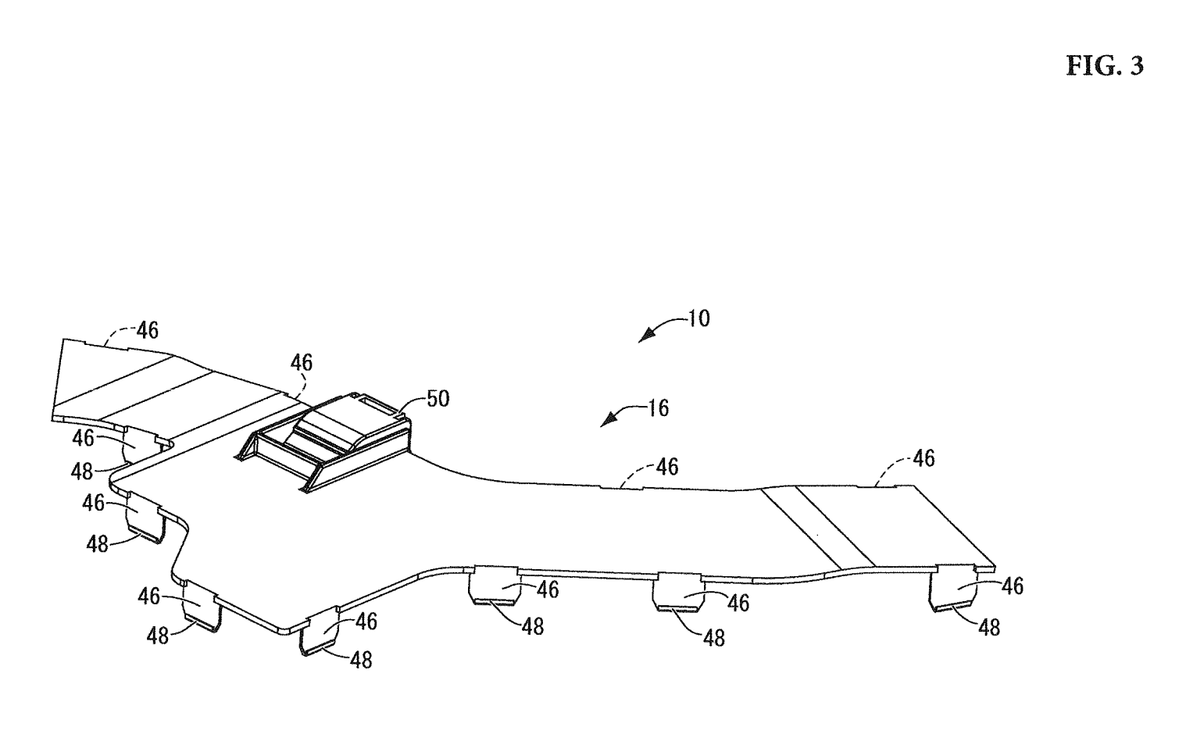
FIG. 3 is a perspective view of the lid of the wire accommodation protector shown in FIG. 1.

Lock lugs 46 are provided on the outer peripheral edges of the lid 16, as shown in FIG. 3. The lock lugs 46 protrude from the lid 16 toward the protector body 12 in a manner that allows the lugs 46 to flex in their thickness direction. Each lock lug 46 has a trapezoidal shape tapering toward its distal end. A lock projection 48 is provided on the distal end and protrudes outward in the direction of the thickness of the lug. The lock lugs 46 are formed to correspond to the number and positions of the lock lug insertion holes 38. A lock nail 50 is provided for structural reinforcement at the center of the upper surface of the lid 16. The lock nail 50 engages and fastens to the lock frame 52 (shown in FIG. 4) projecting from the outer surface of a sidewall 20 of the protector body 12. As with the protector body 12, the lid 16 is formed unitarily of polypropylene (PP), polyamide (PA), or any other suitable synthetic resin, for example, by injection molding, but is formed separately from the protector body 12.

Figure 4:
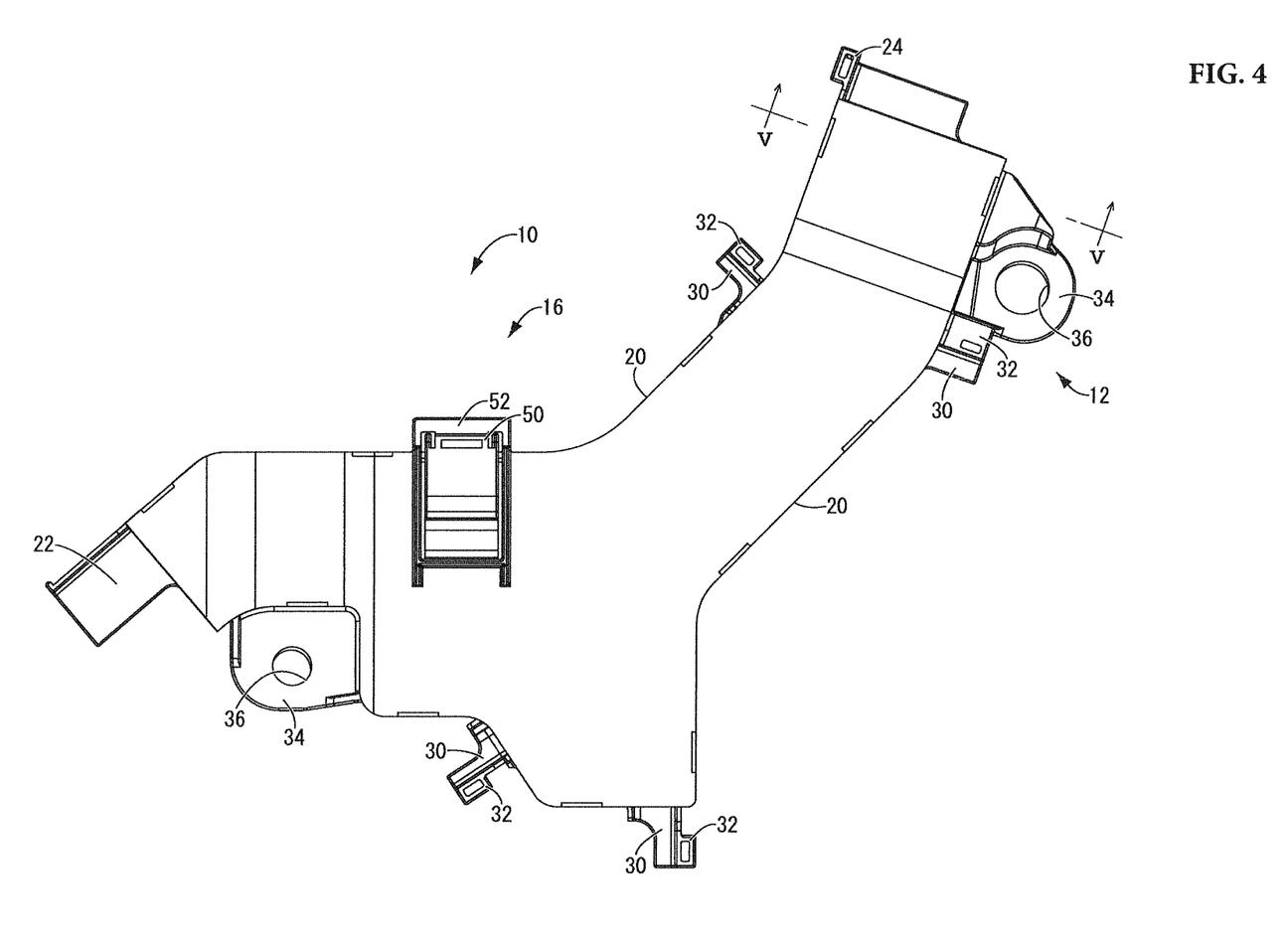
FIG. 4 is a plan view of the wire accommodation protector shown in FIG. 1.

The lock lugs 46 of the lid 16 are inserted into the respective lock lug insertion holes 38 of the protector body 12 so that the lock projections 48 of the lock lugs 46 engage the lock protrusions 44 of the lock lug insertion holes 38. Thus, the lid 16 interlocks with the protector body 12, as shown in FIGS. 1 and 4. In this way, the lock protrusions 44 of the lock lug insertion holes 38 and the lock projections 48 of the lock lugs 46 together constitute a locking mechanism.

Figure 5:
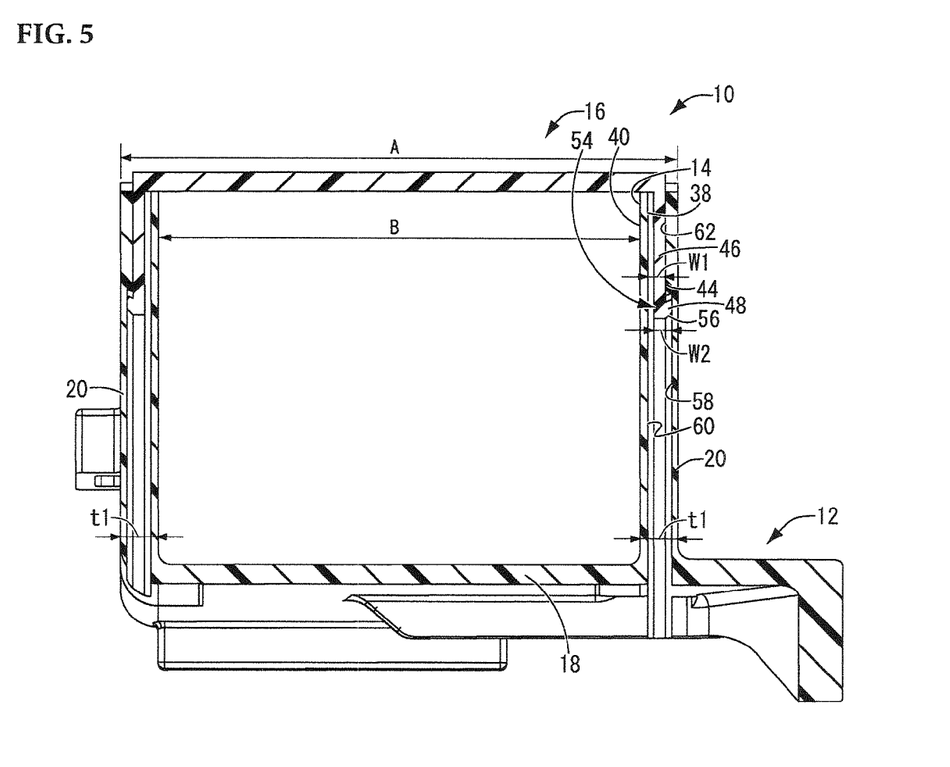
FIG. 5 is an enlarged cross section taken on line V-V of FIG. 4.

The locking mechanism is illustrated in detail in FIG. 5. First, the distal ends of the lock lugs 46 of the lid 16 are inserted into the respective lock lug insertion holes 38. The distal end of each lock lug 46 has a lock projection forming portion 54. The distal end of each lock projection forming portion 54 has a tapered surface 56 that projects gradually out from the distal end toward the proximal end with respect to the direction in which the lid 16 is assembled to the protector body 12. Therefore, by pressing the distal ends of the lock lugs 46 on the lid 16 into the protector body 12, the tapered surfaces 56 cause the lock lugs 46 to flex inward of the lid 16 and slide into the lock lug insertion holes 38. A lock protrusion 44 is formed in the upper portion of each lock lug insertion hole 38. The lock protrusion 44 protrudes from the outside inner surface 58 of the insertion hole 38 toward the inside inner surface 60 of the lock lug insertion hole 38 with the inner surfaces 58 and 60 together defining the lock lug insertion hole 38. The dimension W1 between the protrusion end face 62 of the lock protrusion 44 and the inside inner surface 60 of the lock lug insertion hole 38 is the same as or slightly larger than the dimension W2 of the thickness of the lock projection forming portion 54 of the lock lug 46. This configuration facilitates advancement of the lock lug 46 farther into the lock lug insertion hole 38. Once the lock projection forming portion 54 on the distal end of the lock lug 46 clears the lock protrusion 44, the lock lug 46 elastically reverts to its original shape, bringing the lock projection 48 into contact with the outside inner surface 58 of the lock lug insertion hole 38. This in turn causes the lock projection 48 of the lock lug 46 to engage the lock protrusion 44 of the lock lug insertion holes 38, thus interlocking the lid 16 with the protector body 12.

Referring to FIGS. 5-6, the size of the accommodating space of the wire accommodation protector 10 thus constructed will be described hereinafter in comparison with the wire accommodation protector 2 with the conventional structure. First, as shown in FIG. 5, the accommodating space B of the wire accommodation protector 10 according to this embodiment corresponds to the dimension between the opposing sidewalls 20. As shown in FIG. 2, the sidewalls 20 have a thickness of t1 where lock lug insertion holes 38 are formed. Then, the size of the accommodating space B of the wire accommodation protector 10 is expressed by A−2×t1, in which "A" represents the allowable mounting space. On the other hand, as shown in FIG. 6, the accommodating space C of the wire accommodation protector 2 with the conventional structure corresponds to the dimension between the opposing sidewalls 5. It is assumed that the sidewalls 5 of the wire accommodation protector 2 have the same thickness as the thickness t2 of the sidewalls 20 of the wire accommodation protector 10 where no lock lug insertion holes 38 are formed, as shown in FIG. 2. Then, the size of the accommodating space C of the wire accommodation protector 2 is expressed by A−2×t2−2×α, in which "A" represents the allowable mounting space. As described above, since the thickness t1 is only slightly larger than the thickness t2, it can be seen that the accommodating space B of the wire accommodation protector 10 of this embodiment is larger than the accommodating space C of the conventionally structured wire accommodation protector 2 by approximately the amount of protrusion of the locking mechanism 6 from the protector body 4 (2×α).

In short, the wire accommodation protector 10 of this embodiment is capable of containing within the sidewalls 20 of the protector body 12 the locking mechanism, comprised of the lock projections 48 and the lock protrusions 44, for locking the protector body 12 and the lid 16 together. This enlarges the space between the sidewalls 5 of the protector body 4 to the maximum allowable accommodating space (A−2×t1) of the wire accommodation protector as compared to the wire accommodation protector 2 with the conventional structure, in which the locking mechanism 6 protrudes from the outer surfaces of the sidewalls 5 of the protector body 4. This configuration advantageously reduces the dead space (2×α) alongside the protector body 4 created by the locking mechanism 6 protruding from the outer surfaces of the sidewalls 5 of the protector body 4, and in turn significantly expands the space for accommodating wires within the protector body. The locking mechanism, comprised of the lock projections 48 and the lock protrusions 44, is contained within the sidewalls 20 of the protector body 12. Accordingly, even if the sidewalls 20 of the protector body 12 are separated to secure the maximum allowable space therebetween, the wire accommodation protector 10 itself does not jut out of the allowable accommodating space A, thus maintaining its compact size and expanding the space for accommodating wires within the protector body 12.

Moreover, with the lock projections 48 and the lock protrusions 44 contained within the sidewalls 20 of the protector body 12, the danger of the lock projections 48 and the lock protrusions 44 snagging wires or other objects in the surrounding areas and causing malfunctions, such as broken wires, advantageously are reduced. As described above, a lock projection 48 is provided on the outer surface of each of the lock lugs 46 protruding from the outer peripheral edges of the lid 16. This advantageously avoids the possibility of interference between the wires laid through the protector body 12 and the lock projections 48 when mounting the lid 16 on the protector body 12. In addition, when mounting the lid 16, the lock lugs 46 flex inward of the lid 16. This flexure of the lugs 46 reduces the upward deformation of the lid 16 away from the top opening 14 of the protector body 12, thus stably retaining the lid 16 once it is mounted.

Furthermore, since the sidewalls 20 of the protector body 12 are slightly thicker where the lock lug insertion holes 38 are formed internally, sufficient rigidity is ensured for the lock lug insertion holes 38 and the respective mating lock lugs 46 while advantageously creating sufficient space for engagement between the lock projections 48 and the lock protrusions 44. Due to the foregoing construction, the locking mechanism contained within the walls 20 of the protector body 12 advantageously achieves stable locking ability. Moreover, the regions of the inner surfaces 40 of the sidewalls 20 where the lock lug insertion holes 38 are formed protrude slightly more inward than the other regions of the inner surfaces of the sidewalls 20 so as to ensure the sidewalls 20 are sufficiently thick in the regions where the lock lug insertion holes 38 are formed. This configuration maximizes the accommodating space within the protector body 12 in the regions other than where the lock lug insertion holes 38 are formed. Compared to the conventional structure, therefore, the dead space created by the locking mechanism is drastically reduced and the capacity of the wire accommodation protector is advantageously improved while ensuring the locking mechanism has stable locking ability.

The invention is not limited to the preferred embodiment described above. For example, each lock projection 48 may alternatively protrude inward from the lock lug 46 in the direction of thickness with each lock protrusion 44 protruding outward from the inside inner surface 60 toward the outside inner surface 58.

Moreover, in the foregoing embodiment, the regions of the inner surfaces 40 of the sidewalls 20 where the lock lug insertion holes 38 are formed protrude slightly inward of the protector body 12 down the entire height of the regions. Alternatively, only the upper portions of these regions of the inner surfaces 40 of the sidewalls 20 may have inward protrusions in the protector body 12.

What is claimed is:

1. A wire accommodating protector, comprising
a trough-shaped protector body, lock lug insertion holes formed in sidewalls of the protector body, the lock lug insertion holes extending within and down a full height of the sidewalls and being open at top surfaces of the sidewalls, each of the lock lug insertion hole having a lock protrusion formed therein; and
a lid for covering a top opening of the protector body, lock lugs provided on outer peripheral edges of the lid and protruding toward the protector body in a manner that allows the lock lugs to flex, each of the lock lugs having a lock projection thereon, the lock lugs being dimensioned and disposed to be inserted respectively into the lock lug insertion holes when the lid is placed on the protector body so that the lock projections engage the lock protrusions to lock the lid on the protector body.

2. The wire accommodating protector of claim 1, wherein the sidewalls of the protector body have thickness where the lock lug insertion holes that are formed is slightly larger than thicknesses of other regions of the sidewalls, and regions of inner surfaces of the sidewalls where the lock lug insertion holes are formed protrude more inward of the protector body than other regions of the inner surfaces of the sidewalls where no lock lug insertion holes are formed.

3. The wire accommodating protector of claim 1, wherein each of the lock projections is provided on an outer surface of the respective lock lug, and each of the lock protrusions is provided between an outside inner surface and an inside inner surface of the respective lock lug insertion hole, the outside and inside inner surfaces opposing each other and defining the insertion hole and the lock protrusion protruding from the outside inner surface toward the inside inner surface, and
wherein a gap is formed between a protrusion end face of the lock protrusion and the inside inner surface of the lock lug insertion hole, the protrusion end face opposing the inside inner surface, and the gap permits a lock projection forming portion of the lock lug to be inserted therein.

* * * * *